United States Patent [19]
Hollinger

[11] Patent Number: 5,649,028
[45] Date of Patent: Jul. 15, 1997

[54] CONNECT-THE-DOTS DRAWING PRODUCTION DEVICE

[76] Inventor: Steven J. Hollinger, 50 Melcher St., Boston, Mass. 02210

[21] Appl. No.: 326,641

[22] Filed: Oct. 20, 1994

[51] Int. Cl.⁶ ............................................. G06K 9/48
[52] U.S. Cl. .................. 382/199; 382/195; 382/267; 434/85; 446/146
[58] Field of Search ........................ 382/199, 108, 382/163, 175, 195, 201, 204, 256, 266, 267, 268, 269; 434/85; 446/146

[56] References Cited

U.S. PATENT DOCUMENTS

| | | | |
|---|---|---|---|
| 3,778,541 | 12/1973 | Bowker | 178/5.2 A |
| 4,288,537 | 9/1981 | Kentzger | 434/169 |
| 4,669,984 | 6/1987 | Jones et al. | 434/85 |
| 4,855,933 | 8/1989 | Kondo | 382/267 |
| 4,952,051 | 8/1990 | Lovell et al. | 352/87 |
| 5,086,481 | 2/1992 | Yoshida et al. | 382/267 |
| 5,093,717 | 3/1992 | Sandrew | 358/81 |
| 5,150,459 | 9/1992 | Kajimoto | 395/151 |
| 5,305,433 | 4/1994 | Ohno | 395/150 |
| 5,397,865 | 3/1995 | Park | 178/18 |

*Primary Examiner*—Leo Boudreau
*Assistant Examiner*—Bipin Shalwala
*Attorney, Agent, or Firm*—Wolf, Greenfield & Sacks, P.C.

[57] ABSTRACT

The present invention provides a device for automatically creating a connect-the-dots drawing from an existing image. Edge detection techniques are used to determine the edges in an image and corner points are determined along the edges. The corner points are then ordered and outputted with numbers to create the connect-the-dots drawing.

12 Claims, 2 Drawing Sheets

CONNECT-THE-DOTS DRAWING PRODUCTION DEVICE

FIELD OF THE INVENTION

The present invention relates to image processing devices. More specifically, it relates to a device for producing connect-the-dots or dot-to-dot drawings.

BACKGROUND OF THE INVENTION

Connect-the-dots drawings are used, often by children, in order to draw pictures from a set of points. Each point has a number indicating its position in the order of the dots. The user draws a line connecting all of the dots, in order, to complete the drawing. The creation of such drawings can be difficult and time consuming. First, a drawing must be created in outline form. Then points along the outline have to be determined and placed in a certain order. Finally, the dots are separated from the lines to create the connect-the-dots drawing and numbers are added to indicate the order for drawing.

Therefore, a need exists for a device for automatically creating connect-the-dots drawings from existing images.

SUMMARY OF THE INVENTION

The above difficulties in creating connect-the-dots drawings are substantially overcome by the present invention, which includes a device for automatically creating a connect-the-dots drawing. A computer operated device is used to determine edges in image data. The edges are then analyzed to determine corners or principal points. The edge data is deleted and the points ordered and numbered to create the connect-the-dots drawing. In another aspect of the invention, non-boundary edges are maintained in the drawing to provide additional detail. In another aspect of the invention, pictures are scanned to generate the image data.

Therefore, it is an object of the present invention to automatically produce connect-the-dots drawings from image data. It is another object of the present invention to use edge detection techniques in producing the connect-the-dots drawing.

With these and other objects, advantages and features of the invention that may become apparent, the nature of the invention can be more clearly understood by reference to the following detailed description of the invention, the appended claims and the several drawings attached hereto.

DETAILED DESCRIPTION OF PREFERRED EMBODIMENT

Figure 1:
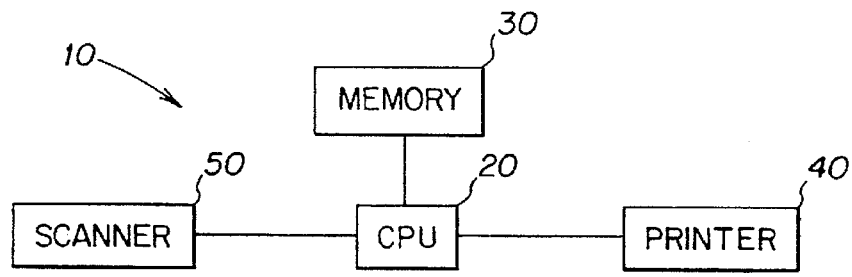
FIG. 1 is a block diagram of a preferred embodiment of the connect-the-dots drawing production device of the present invention.

As illustrated in FIG. 1, a device 10 for creating a connect-the-dots drawing includes a central processing unit (CPU) 20, a memory 30, and a printer 40. The memory 30 can be any type of memory for storing image data, such as a hard drive, floppy drive, RAM, ROM or CD-ROM. The printer 40 is used to output the final drawing and can include any type of printing device. The CPU 20 is appropriately programmed to implement the steps illustrated in FIG. 2 to output a connect-the-dots drawing on the printer 40 based upon image data stored in the memory 30. A scanner 50 can be connected to the CPU 20 to generate image data from an existing image prior to storage in the memory 30. Alternatively, the image data can be stored in the memory 30 from another memory source.

Figure 2:
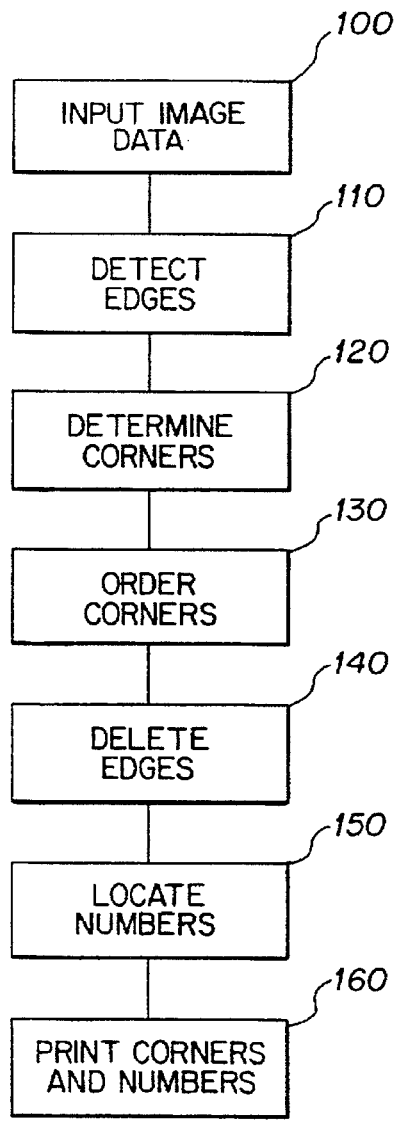
FIG. 2 is a block flow diagram of the operation of the device in FIG. 1.

FIG. 2 illustrates operation of the device 10 of FIG. 1 to produce a connect-the-dots drawing. At step 100, image data is input and stored in the memory 30. The image data typically includes color or grayscale values for pixels in the image. Conventional edge detection techniques are applied to the image data to determine edges, at step 110. Edge detection determines high frequency changes in image data between adjacent pixels. The threshold level for determining edges can be adjusted in order to set the intricacy of the final output and the amount of detail in the drawing.

Corner points are determined, at step 120, by changes in direction between points along the edge. Corner points can be omitted from edges which do not form closed boundaries and only provide detail in the drawing.

Figure 3A:
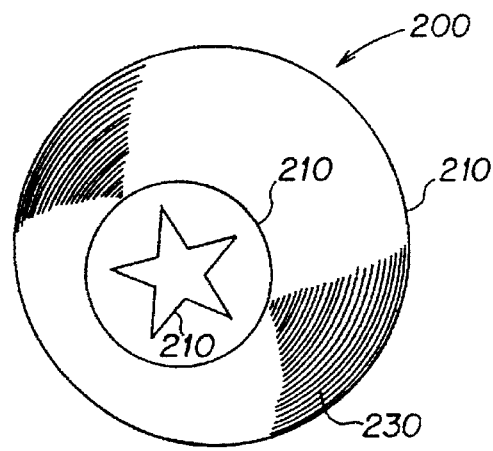
FIGS. 3A–3C illustrate the process for producing a connect-the-dots drawing according to the present invention.
Figure 3B:
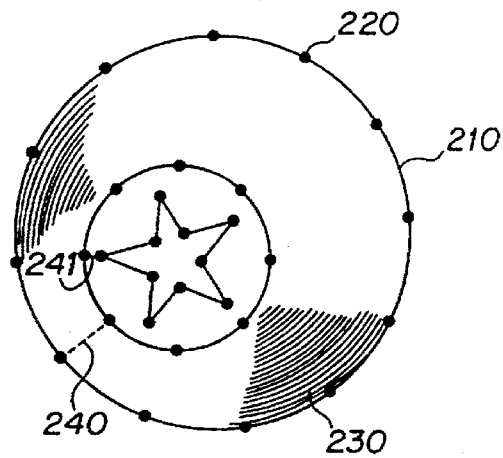
Figure 3C:
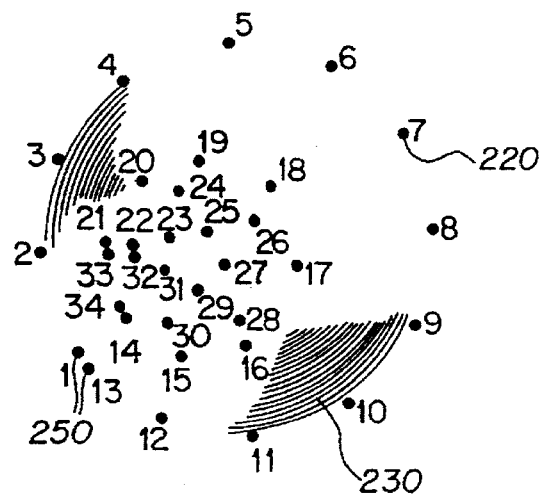

FIGS. 3A through 3C illustrate operation of the device on an image 200 consisting of a ball having a circle and star on it. At step 110, the edges 210, 230 of the image 200 are determined. The edges can form boundaries 210, which are closed lines, or non-boundaries 230, which provide detail. Corner points 220 are then placed along the boundary edges 210. At step 130, the corner points are ordered to determine the lines in the connect-the-dots drawing. In some instances, for a circular boundary, two points 250 should be closely located in order to complete the circle. Additionally the closest corner points on non-intersecting boundaries should be ordered to succeed one another. This will minimize the additional edges 240, 241 in the completed drawing.

Non-corner points along the boundary edges 210 are deleted from the data at step 140. However, non-boundary edges 230 can be maintained to provide additional detail in the final output.

In step 160, the points and corresponding numbers are printed in hardcopy form on the printer 40. The remaining non-boundary edges may also be printed. Prior to printing, the numbers need to be associated with the corresponding points and located near the points (step 150). The hard copy version of the connect-the-dots drawing can then be used to connect the indicated points by hand.

Although a preferred embodiment is specifically illustrated and described herein, it will be appreciated that modifications and variations of the present invention are covered by the above teachings and within the purview of the appended claims without departing from the spirit and intended scope of the invention.

I claim:

1. Apparatus for processing an image to automatically produce a connect-the-dots drawing based upon the image, comprising:

memory storing image data representing the image;
   edge means for detecting edges in said image data;
   point means for determining corner points on said detected edges;
   ordering means for ordering said corner points and associating ordered numbers with said corner points according to the ordering of said corner points;
   printing means for printing dots at positions on a medium representing relative positions of said corner points and printing said numbers on the medium at locations near respective dots representing associated corner points.

2. The apparatus of claim 1, further comprising means for scanning an image to produce said image data.

3. The apparatus of claim 1, wherein said edge means includes means for detecting boundary edges and non-boundary edges, wherein said point means determines corner points on said boundary edges, and wherein said printing means prints lines representing said non-boundary edges at positions relative to the dots.

4. The apparatus of claim 1, wherein said point means includes means for determining changes in direction between locations on said detected edges.

5. The apparatus of claim 1, wherein said ordering means orders said corner points such that a first corner point on a first boundary edge follows a second corner point on a second boundary edge which does not intersect said first boundary edge, and wherein said first corner point and said second corner point are closer than other points on said first and second boundary edges.

6. A method for processing an image to automatically produce a connect-the-dots drawing, comprising the steps of:

detecting edges in image data representing the image;

determining corner points on said detected edges;

ordering said corner points;

associating ordered numbers with said corner points according to said order;

printing dots at positions on a medium representing relative positions of said corner points; and printing said ordered numbers on the medium at locations near respective dots representing associated corner points.

7. The method of claim 6, further comprising the step of scanning an image to produce said image data.

8. The method of claim 7, further comprising the step of storing said image data.

9. The method of claim 6, wherein said detecting step includes detecting boundary edges and non-boundary edges, and wherein said determining step determines corner points only on said boundary edges.

10. The method of claim 9, further comprising the step of printing lines on the medium representing said non-boundary edges at positions relative to the dots.

11. The method of claim 6, wherein corner points are determined by changes in direction between locations on said detected edges.

12. The method of claim 9, wherein said corner points are ordered such that a first corner point on a first boundary edge follows a second corner point on a second boundary edge which does not intersect said first boundary edge, and wherein said first corner point and said second corner point are closer than other points on said first and second boundary edges.

* * * * *